(12) United States Patent
Wilk et al.

(10) Patent No.: US 6,714,391 B2
(45) Date of Patent: Mar. 30, 2004

(54) ULTRACAPACITOR ENERGY STORAGE CELL PACK AND METHODS OF ASSEMBLING AND COOLING THE SAME

(75) Inventors: Michael D. Wilk, Temecula, CA (US); Kevin T. Stone, San Diego, CA (US)

(73) Assignee: ISE Research Corporation, San Diego, CA (US)

( * ) Notice: Subject to any disclaimer, the term of this patent is extended or adjusted under 35 U.S.C. 154(b) by 135 days.

(21) Appl. No.: 09/972,085

(22) Filed: Oct. 4, 2001

(65) Prior Publication Data

US 2003/0067735 A1 Apr. 10, 2003

(51) Int. Cl.$^7$ .................................................. H01G 2/12
(52) U.S. Cl. .......................................... 361/15; 361/695
(58) Field of Search ................................. 361/690–695, 361/103

(56) References Cited

U.S. PATENT DOCUMENTS

| | | | |
|---|---|---|---|
| 3,809,969 A | 5/1974 | Williams et al. | 317/120 |
| 3,875,479 A | 4/1975 | Jaggar | 317/101 CM |
| 3,983,458 A | 9/1976 | Jordan et al. | 317/101 CP |
| 4,021,631 A | 5/1977 | Sprando | 200/238 |
| 4,654,694 A | 3/1987 | Val | 357/74 |
| 4,841,100 A | 6/1989 | Ignasiak | 174/138 G |
| 4,878,155 A | 10/1989 | Conley | 361/401 |
| 4,913,983 A * | 4/1990 | Cheiky | 429/13 |
| 4,950,170 A | 8/1990 | Miller, Jr. | 439/74 |
| 5,029,038 A | 7/1991 | Covi et al. | 361/58 |
| 5,420,755 A | 5/1995 | Hiller | 361/761 |
| 5,439,398 A | 8/1995 | Testa et al. | 439/801 |
| 5,543,586 A | 8/1996 | Crane, Jr. et al. | 174/262 |
| 5,610,371 A | 3/1997 | Hashimoto et al. | 174/262 |
| 5,679,033 A | 10/1997 | Eavey et al. | 439/801 |
| 5,707,242 A | 1/1998 | Mitra et al. | 439/74 |
| 5,920,463 A | 7/1999 | Thomas et al. | 361/760 |
| 6,033,267 A | 3/2000 | Smyk | 439/682 |
| 6,445,582 B1 * | 9/2002 | Oda et al. | 361/695 |

* cited by examiner

Primary Examiner—Stephen W. Jackson
Assistant Examiner—Boris Benenson
(74) Attorney, Agent, or Firm—Procopio Cory Hargreaves & Savitch

(57) ABSTRACT

An ultracapacitor energy storage cell pack includes an ultracapacitor mounting assembly having a circuit board, a cooling assembly connected to the ultracapacitor mounting assembly and adapted to supply a cooling air stream therein, and a plurality of capacitors including a pair of terminals and an exterior casing, the plurality of capacitors mounted to at least the circuit board of the ultracapacitor mounting assembly with the pair of terminals, allowing the exterior casing to be in the path of the cooling air stream.

1 Claim, 3 Drawing Sheets

US 6,714,391 B2

ULTRACAPACITOR ENERGY STORAGE CELL PACK AND METHODS OF ASSEMBLING AND COOLING THE SAME

BACKGROUND OF THE INVENTION

1. Field of the Invention

The field of the invention relates, in general, to mounting, assembling, connecting, cooling, and/or sealing of individual energy storage cells in a multiple energy storage cell pack, and, in particular, to mounting, assembling, connecting, cooling, and/or sealing of individual capacitors in an ultracapacitor energy storage cell pack.

2. Related Art

An ultracapacitor energy storage cell pack includes multiple interconnected cells of individual capacitors that store an electrical charge. For vehicle applications, the ultracapacitor packaging has to provide protection against vibration, shock, temperature, and corrosive effects of water, dust, and debris in the mobile vehicle environment. The capacitors must be held in place, need to be cooled, and need environmental protection for their terminals and the copper interconnects between the capacitors.

During charging and discharging operation of the capacitors, parasitic effects cause the cell temperature to increase. Cooling is required to minimize increased temperature operation that would degrade the energy storage and useful life of the capacitor. Each capacitor includes an exterior capacitor casing and a pair of terminals. Prior mounting arrangements for ultracapacitors have held the capacitors by the exterior casing, obstructing an important part of the capacitors for efficient cooling.

In addition to the cooling problems with prior ultracapacitors, in prior ultracapacitors, capacitors have also been connected by attaching copper wire to the terminal lugs, and the terminals and interconnections have been protected by placing a seal cover on each individual capacitor. Prior ultracapacitors have also required that the monitoring and control circuits have a separate circuit board and package with a separate wiring harness connected to each of the individual capacitor terminals. Because of the complexity of these prior ultracapacitors, they require numerous components, more assembly steps, protection of the terminal and inter connections is more difficult, and a shock and vibration support structure is still required.

SUMMARY OF THE INVENTION

An aspect of the invention involves a system and method to mechanically secure, electrically connect, environmentally seal, and assemble an ultracapacitor network pack of individual capacitors. A circuit board rigidly locates the capacitors in the pack and electrically connects the capacitors into energy storage and control circuits. Copper interconnections under the circuit board are the power conductors that connect the individual capacitors. An insulated solid flat bottom plate and a cutout lattice plate with cutout holes at the other end of the cells provides a second point of location and support while allowing cooling air to circulate around a middle space. The circuit board and two foam sheet layers seal around the copper interconnections and a top rim of the capacitors. A flat transparent plastic cover is secured and sealed over the top of the circuit board to provide for visual observation of LED indicators and voltage-current displays. The whole package is bolted together and becomes a rugged power module suitable for mobile vehicular applications. The inventors of the present invention recognized that because tests show no significant temperature difference between the capacitor terminals and the capacitor case, the terminals can be sealed against the environment while allowing the capacitor to be cooled by an air stream around the surface area of the case.

Another aspect of the invention involves a method of assembling an ultracapacitor energy storage cell pack. Individual capacitors are supplied as a can with two threaded lug terminals that protrude through an insulated cover. The ultra capacitor pack assembly process starts by placing the capacitor cans onto the bottom plate through the cutout holes in the lattice plate. Next, to seal and insulate around the can tops, a sheet of foam insulator with cutouts for the capacitor terminals is laid on top of the capacitors. The copper interconnections are then placed over the capacitor terminals followed by another sheet of foam insulator with cutouts for the copper interconnections. The circuit board is added to the stack and bolted to the capacitor terminals. A top transparent cover and frame complete the assembly. The method of mounting the capacitors was developed to simplify the assembly process, keep the case open to cooling airflow, insulate the terminals, and reduce the number of parts by having the circuit board perform multiple mechanical and electrical functions. The invention is easily adaptable to large numbers of cells in various geometric configurations.

An additional aspect of the invention involves an ultracapacitor energy storage cell pack. The pack includes an ultracapacitor mounting assembly having a circuit board, a cooling assembly connected to the ultracapacitor mounting assembly and adapted to supply a cooling air stream therein, and a plurality of capacitors including a pair of terminals and an exterior casing, the plurality of capacitors mounted to at least the circuit board of the ultracapacitor mounting assembly with the pair of terminals, allowing the exterior casing to be in the path of the cooling air stream.

Another aspect of the invention involves an ultracapacitor energy storage cell pack. The pack includes an ultracapacitor mounting assembly having a circuit board, a plurality of capacitors including a pair of terminals, the plurality of capacitors mounted to at least the circuit board of the ultracapacitor mounting assembly with the pair of terminals, and a sealing material to seal the pair of terminals of the capacitors against collection of water, dust, and debris that may tend to contaminate and corrode the terminals and otherwise degrade the performance of the capacitors.

A further aspect of the invention involves an ultracapacitor energy storage cell pack. The pack includes a plurality of capacitors having a pair of terminals, a plurality of electrically conductive interconnects to connect the capacitors via the terminals, and an ultracapacitor mounting assembly to which the plurality of capacitors are mounted, the ultracapacitor mounting assembly includes means for mounting, carrying and sealing the electrically conductive interconnects, means for maintaining the position and spacing of the capacitors in an X and Y direction, means for holding down the capacitors in a Z direction, means for preventing the capacitors from rotating, and means for mounting the capacitors to the ultracapacitor mounting assembly via the pair of terminals.

A still further aspect of the invention involves an ultracapacitor energy storage cell pack. The pack includes a plurality of capacitors including a pair of terminals and a cover; a plurality of electrically conductive interconnects including holes through which the terminals may pass, the electrically conductive interconnects connecting the capacitors via the terminals; and an ultracapacitor mounting assembly to which the plurality of capacitors are mounted, the ultracapacitor mounting assembly including a bottom base plate on which the capacitors are located and a crate plate with a plurality of holes through which the capacitors are received, a box frame including large lower and upper openings through which the capacitors extend, a first insulating and sealing sheet located on the cover of the capacitors and including a plurality of holes through which the terminals protrude, a second insulating and sealing sheet located on top of the first sheet and including a plurality of holes that receive the plurality of electrically conductive interconnections, the holes of the electrically conductive interconnections receiving the terminals of the capacitors, one or more circuit boards located on top of the second insulating and sealing sheet and including holes through which the terminals protrude, and fasteners to attach the terminals to the one or more circuit boards to compress the first and second insulating and sealing sheets in between the cover of the capacitors and the one or more circuit boards, and secure the capacitors and electrically conductive interconnections in position.

An additional aspect of the invention involves a method of assembling an ultracapacitor energy storage cell pack having a plurality of capacitors with a cover, a pair of terminals protruding from the cover, an exterior casing. The method includes inserting a plurality of capacitors through holes in a crate plate, on top of a bottom base plate; disposing a box frame over the capacitors so that the capacitors extend through large lower and upper openings of the box frame; placing a first insulating and sealing sheet on top of the capacitors so that the terminals protrude through holes in the sheet; placing a second insulating and sealing sheet on top of the first sheet, the second insulating and sealing sheet including a plurality of holes to receive a plurality of electrically conductive interconnections; locating a plurality of electrically conductive interconnections in the plurality of holes of the second insulating and sealing sheet so that the terminals of the capacitors extend through holes in the electrically conductive interconnections; placing one or more circuit boards on top of the second insulating and sealing sheet so that the terminals protrude through the one or more circuit boards; and attaching the terminals to the one or more circuit boards using fasteners, compressing the first and second insulating and sealing sheets in between the cover of the capacitors and the one or more circuit boards, and securing the capacitors and electrically conductive interconnections in position.

Another aspect of the invention involves a method of cooling capacitors of an ultracapacitor energy storage cell pack. The method includes providing an ultracapacitor energy storage cell pack having an ultracapacitor mounting assembly including a circuit board, and a plurality of capacitors including a pair of terminals and an exterior casing, the plurality of capacitors mounted to at least the circuit board of the ultracapacitor mounting assembly with the pair of terminals; and supplying a cooling air stream over the exterior casing of the capacitors to cool the capacitors of the ultracapacitor energy storage cell pack.

A further aspect of the invention involves an ultracapacitor energy storage cell pack. The pack includes an ultracapacitor mounting assembly including a circuit board with a plurality of holes, and a plurality of capacitors including terminals, the terminals received by the holes of the circuit board to mount the plurality of capacitors to the circuit board of the ultracapacitor mounting assembly.

BRIEF DESCRIPTION OF THE DRAWINGS

The following drawings illustrate the design, utility, and assembly of preferred embodiments of the invention.

DETAILED DESCRIPTION OF THE PREFERRED EMBODIMENT

Figure 1:
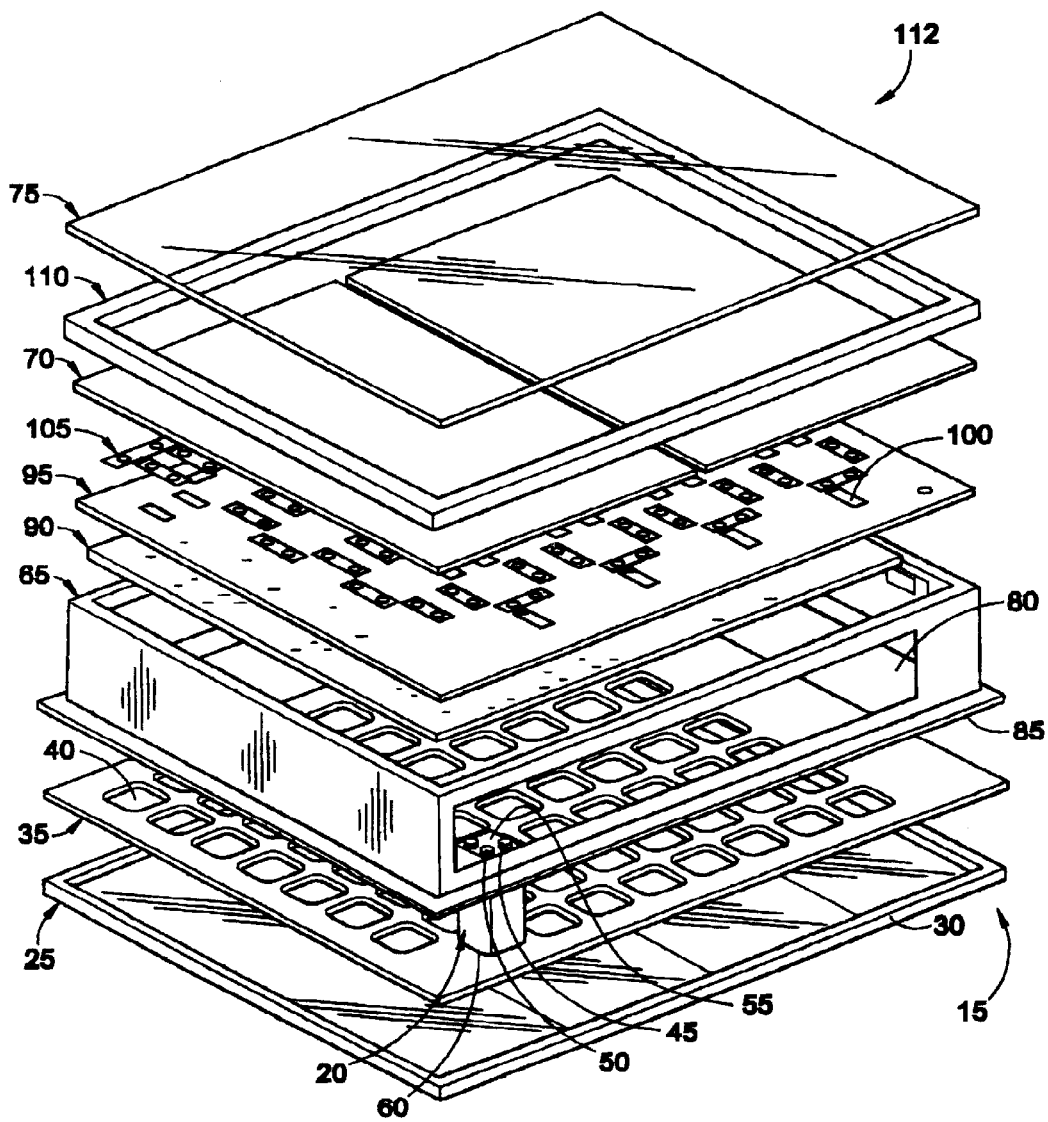
FIG. 1 is an exploded perspective view drawing of an embodiment of a half module of an ultracapacitor energy storage cell pack.
Figure 2:
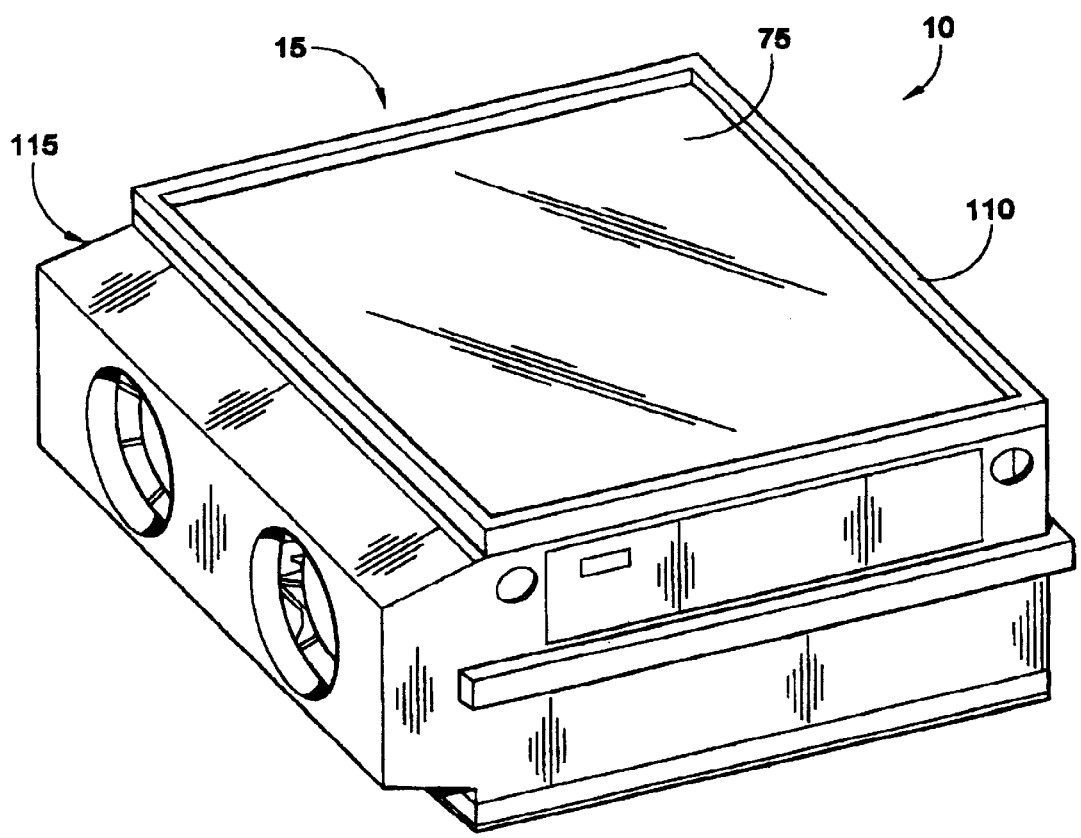
FIG. 2 is a perspective view of an embodiment of an ultracapacitor energy storage cell pack.

With reference to FIGS. 1 and 2, an embodiment of an ultracapacitor energy storage cell pack 10 will now be described. FIG. 1 illustrates an exploded view of an embodiment of a half module 15 of the ultracapacitor energy storage cell pack 10. FIG. 2 illustrates an embodiment of an assembled ultracapacitor energy storage cell pack module 10, which includes two half modules 15 fastened together. Although each half module 15 is shown as having eighty capacitors 20, each half module may have other numbers of capacitors 20. Further, the ultracapacitor pack 10 may have other numbers of modules 15 besides a pair (e.g., 1, 3, 4, etc.).

The ultracapacitor pack 10 is shown in exploded view in FIG. 1 to illustrate the different levels in the half module 15 that are added during assembly of the half module 15. Each of these levels will now be described in turn below followed by a description of the assembly process.

An aluminum base plate 25 forms a bottom or inner-most level of the half module 15. The base plate 25 includes a welded frame 30 around edges of the base plate 25.

A polycarbonate crate plate 35 is seated inside the frame 30 and includes cutouts or holes 40 with a shape that matches the cross-section of the capacitors 20. The base plate 25 and crate cutouts 40 form an x, y, and z location and mounting support for the capacitors 20. The cutouts 40 also prevent the capacitors 20 from rotating during use, e.g., mobile vehicle use.

In the embodiment shown, the individual capacitors 20 have a general square-can shape (i.e., rectangular parallelpiped). The cross-section of the capacitors 20 is 2.38 in.×by 2.38 in. and the length is about 6 in. On an uppermost or outer-most end of the capacitor 20, two threaded lug terminals 45 and a dielectric paste fill port 50 protrudes from an insulated cover 55 of the capacitor 20. The cover 55 of the capacitor may include a well encircled by a protruding rim. Shrink plastic that normally surrounds sides or exterior capacitor casing 60 of the capacitor 20 is removed to better expose the exterior casing 60 to circulated cooling air. The shrink plastic may be left on the bottom of the capacitor 20.

A box frame 65 ties together the base plate 25 and frame 30 with circuit boards 70, and a top polycarbonate cover 75. The box frame 65 has elongated lateral cutouts 80 on two opposing sides to provide for cross-flow air cooling. Bottom flanges 85 provide a mounting surface to tie two of these box frames 65, and, hence, two half modules 15, together to form the single ultracapacitor pack module 10 shown in FIG. 2. The box frame 65 includes a large upper rectangular opening and a large lower rectangular opening.

The next layer is a first ¼-in. foam rubber insulating and sealing sheet 90 that covers the capacitors 20. The first sheet 90 has cutouts for the capacitor terminals 45 and fill port 50 so that the sheet 90 can seal tightly against the cover 55 of the capacitor 20.

A second ⅛-in. foam rubber insulating and sealing sheet 95 may be placed on top of the previous first sheet 90. The second sheet 95 includes rectangular cutouts or holes 100. The cutouts 100 receive copper bar electrical interconnections 105. The cutouts 100 in the sheet 95 simplify the assembly and proper placement of the copper bar electrical interconnections 105. The sheet 95 also seals the copper bar electrical interconnections 105. The copper bar electrical interconnections 105 include holes that the capacitor terminals 45 protrude through.

Figure 3:
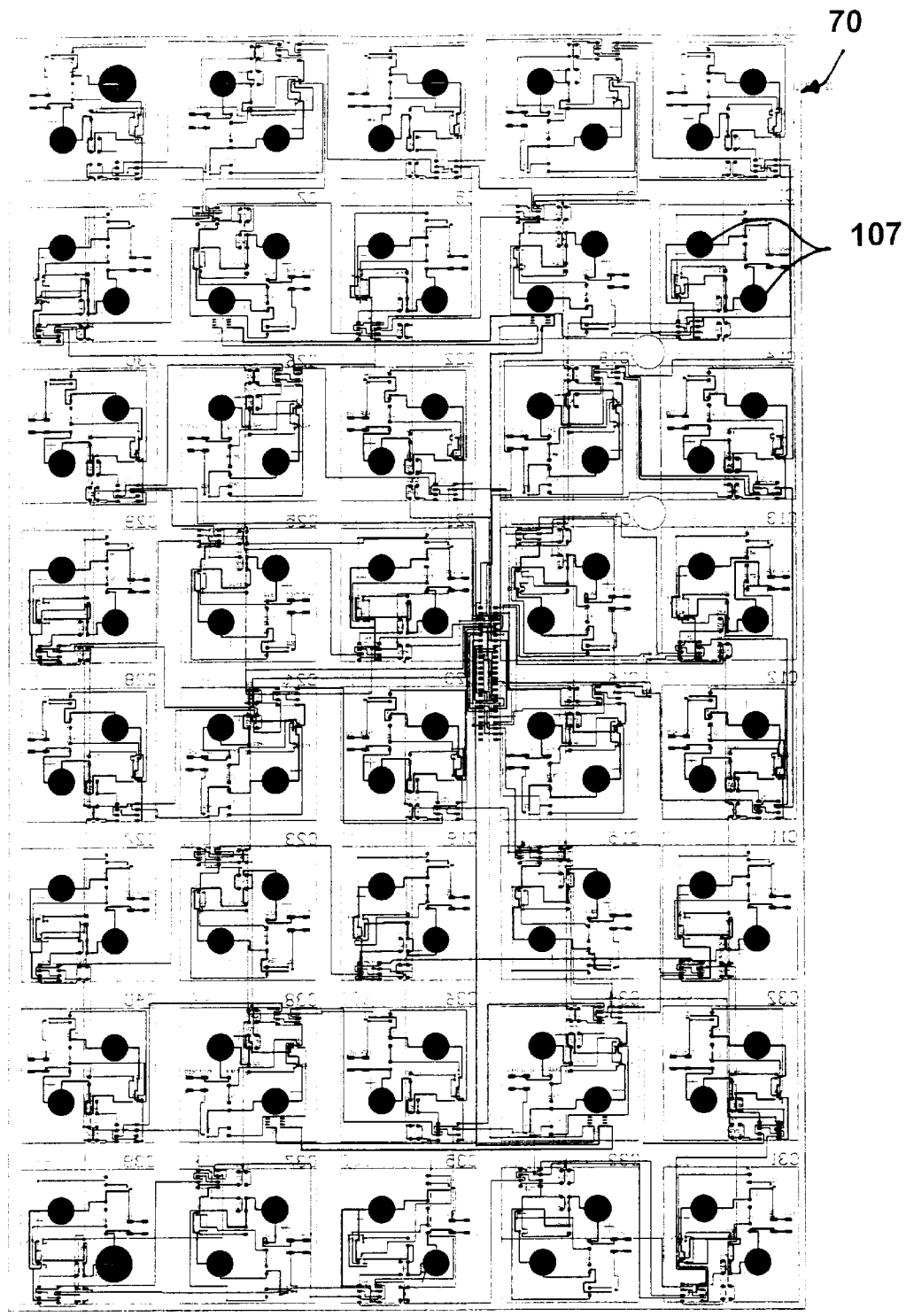
FIG. 3 is a top plan view of an embodiment of a circuit board for the half module illustrated in FIG. 1 and ultracapacitor energy storage cell pack illustrated in FIG. 2.

Two identical main circuit boards 70 (e.g., 40-capacitor main circuit boards) may lay on top of the foam rubber sheets 90, 95. With reference additionally to FIG. 3, each main circuit board 70 may include holes 107 that the capacitor terminals 45 protrude through. In the embodiment shown, each circuit board 70 may have mounting holes 107 for 40 (8×5) capacitors less two corner positions required for frame structure mounting. Instead of two circuit boards 70, a single circuit board 70 may be used. Thus, as used herein, the word "circuit board" means one or more circuit boards. Fasteners such as lug nuts fasten the individual capacitor terminals 45 and copper bars 105 to the circuit boards 70 and compress the foam rubber sheets 90, 95 in between the cover 55 of the capacitor 20 and the circuit boards 70. Thus, the circuit board 70 forms the location and mechanical support as well as the electrical connections for the capacitors 20. The foam sheets 90, 95 seal around the rim of the capacitor terminals 45. A processor and display circuit board mounts on top of the main circuit board 70.

Although the ultracapacitor pack 10 and the half modules 15 are shown as being generally rectangular in shape, either or both may have shapes other than generally rectangular such as, but not by way of limitation, circular, oval, other curvilinear shapes, other rectilinear shapes, and other polygonal shapes.

A top aluminum frame 110 and the transparent polycarbonate cover 75 may attach to the frame structure to complete the half module 15. The transparent cover 75 allows observation of a light emitting diode (LED) failure detection display that indicates the active/inactive status of the capacitors 20.

Together, the bottom base plate 25, crate plate 35, box frame 65, sealing sheets 90, 95, and circuit board(s) 70, and capacitor terminal fasteners form an ultracapacitor mounting assembly 112 for the capacitors 20. The ultracapacitor mounting assembly 112 provides a mounting surface for the copper bar interconnects 105, maintains the position and spacing of the capacitors 20 in the X, Y, and Z directions, does not allow the capacitors to rotate when connected, and the main circuit board(s) 70 provides a mounting platform for the cell equalization, failure detection, processor, and LED display systems. Attaching the capacitors 20 to the mounting assembly 112 by the terminals 45 instead of the exterior capacitor casing 60 allows the capacitors 20 to be more effectively cooled because the majority of the surface area of the capacitors 20 is in the cooling air stream supplied by the cross-flow air cooling assembly 115. Sealing along the cover 55 and around the terminals 45 protects the terminals 45 from water, dust, and other contaminants.

An exemplary method of assembling the ultracapacitor half module 15 will now be described. The capacitors 20 are first placed onto the bottom base plate 25, with the bottoms of the capacitors 20 extending through the square cutouts 40 of the crate plate 35. The box frame 65 is applied over the capacitors 20, so that the capacitors extend through the large lower and upper rectangular openings of the box frame 65. The ¼-in. foam rubber insulating and sealing sheet 90 is placed on top of the capacitors 20, with the capacitor terminals 45 and fill port 50 protruding through cutouts in the sheet 90. The ⅛-in. foam rubber insulating and sealing sheet 95 is placed on top of the previous sheet 90 and the copper bar electrical interconnections 105 are placed into the rectangular cutouts 100 of the sheet 95. The capacitor terminals 45 also protrude through holes in the copper bar electrical interconnections 105. The main circuit boards 70 are layered on top of the foam rubber sheets 90, 95 so that the threaded capacitor terminals 45 protrude through the corresponding holes in the circuit boards 70. Lug nuts are screwed onto the threaded terminals 45, compressing the foam rubber sheets 90, 95 in between the cover 55 of the capacitor 20 and the circuit boards 70, and securing the capacitors 20 and copper bars 105 in position. The processor and display circuit board is mounted on top of the main circuit board 70. The top aluminum frame 110 and the transparent polycarbonate cover 75 are placed over the circuit boards and attached to the frame structure to complete the half module 15. A pair of half modules 15 may be positioned back to back (i.e., facing opposite directions with the bottoms of the aluminum base plates 25 touching) and a cross-flow air cooling assembly 115 may be attached to the frame structure, adjacent the elongated lateral cutouts 80 on one side of the box frames 65. The half modules 15 may be bolted or otherwise fastened together at the respective bottom flanges 85 to complete the ultracapacitor pack module 10.

To determine if one or more capacitors 20 in the pack 10 need to be replaced, a user observes the light emitting diode (LED) failure detection display through the transparent cover 75. The LED failure detection display includes an array of LEDs that correspond to the array of capacitors 20, each LED indicating the status of a corresponding capacitor 20. Each unlit LED indicates a corresponding failed LED. A capacitor 20 in the pack 10 can quickly and easily be replaced by simply unfastening the frame and unbolting only the failed capacitor 20 that had been previously identified by the LED display. The replacement capacitor is put into position and the procedure reversed.

While embodiments and applications of this invention have been shown and described, it would be apparent to those in the field that many more modifications are possible without departing from the inventive concepts herein. The invention, therefore, is not to be restricted except in the spirit of the appended claims.

What is claimed is:

1. An ultracapacitor energy storage cell pack, comprising: an ultracapacitor mounting assembly; a cooling assembly to supply a cooling air stream within the ultracapacitor mounting assembly: and a plurality of capacitors including an exterior casing, the plurality of capacitors mounted within the ultracapacitor mounting assembly so that the exterior casing is in the path of the cooling air stream;

wherein the capacitors include a pair of terminals that are threaded, the mounting assembly includes a circuit board, and further including a pair of threaded fasteners to mount the capacitors to the circuit board of the ultracapacitor mounting assembly;

wherein the ultracapacitor mounting assembly includes a sealing material to seal the pair of terminals of the capacitors;

wherein the capacitors include a cover that the terminals protrude from, and the sealing material seals the cover of the capacitors; and wherein the ultracapacitor mounting assembly includes a sealing material and electrically conductive interconnects carried and sealed by the sealing material, and the electrically conductive interconnects electrically connect the capacitors to each other via the terminals.

* * * * *